United States Patent [19]

Rosenberg

[11] 4,276,520
[45] Jun. 30, 1981

[54] PORTABLE LASER DEVICE

[76] Inventor: Larry Rosenberg, 3440 Caroline Ave., Culver City, Calif. 90230

[21] Appl. No.: 19,702

[22] Filed: Mar. 12, 1979

Related U.S. Application Data

[63] Continuation-in-part of Ser. No. 647,553, Jan. 8, 1976, and a continuation-in-part of Ser. No. 795,159, May 9, 1977, abandoned.

[51] Int. Cl.³ ............................................. H01S 3/091
[52] U.S. Cl. ................................................. 331/94.5 P
[58] Field of Search ...................... 331/94.5 C, 94.5 P, 331/94.5 D, 94.5 E, 94.5 F

[56] References Cited

U.S. PATENT DOCUMENTS

| B 384,654 | 2/1976 | Haun, Jr. et al. | 331/94.5 P |
| 3,392,260 | 7/1968 | Dernbach | 331/94.5 Q |
| 3,753,145 | 8/1973 | Chesler | 331/94.5 P |

*Primary Examiner*—William L. Sikes
*Attorney, Agent, or Firm*—Herzig & Walsh

[57] ABSTRACT

A device for producing a laser beam or discharge. The device is constructed to be portable having a pistol grip. The laser beam is generated in the body or barrel of the device. A neodymium (Nd:YAG) rod or similar material is within a xenon flash tube to which a voltage is applied. A photon emission source is provided at one end of the (Nd:YAG) rod embodying a diode and a parabolic reflector system associated with a polarized mirror which is partly reflective and which in part transmits energy rays. A polarized optical mirror is provided at the opposite end of the (Nd:YAG) rod. Activation of atoms within the rod is initiated within the contents of an optical or resonant cavity providing a means by which the necessary excitation of atoms within the optical active (Nd:YAG) rod can be achieved in order to initiate an elevation in population and subsequent inversion of levels, near and over the threshold value necessary to generate a laser beam and the subsequent discharge of said beam. Heat dissipating means are provided including nylon phenolic quartz acrylic compound constructed to have a heat transfer gradient. Embedded in the compound is heat transfer means provided by longitudinally positioned microcoil heat pipes whereby the heat is transferred to the rear of the device. At the rear is positioned a heat dissipating cube formed by parallel plates with microcoil heat pipes between them. The evolution of heat is initiated by the transference of heat from the microcoiled heat pipes to the nylon phenolic quartz compound, which subsequently vaporizes as heat is absorbed by the compound, the vapor being released at various portal exits or microvents aft of the laser device.

11 Claims, 12 Drawing Figures

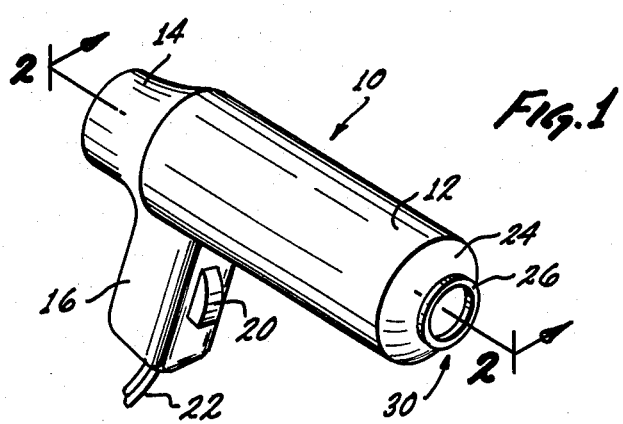
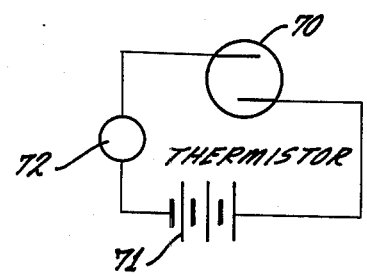
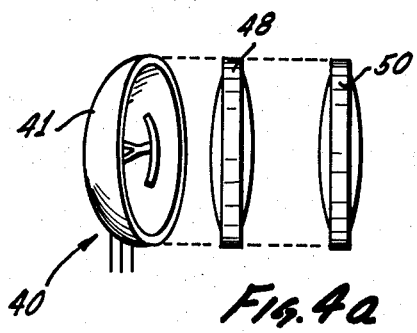
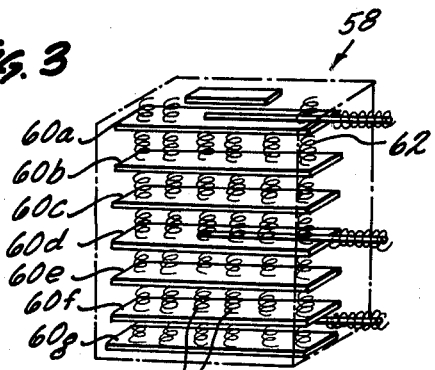
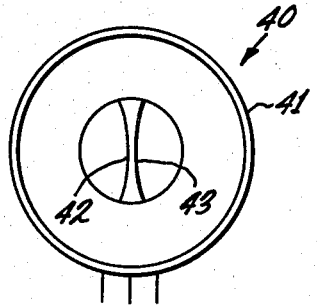
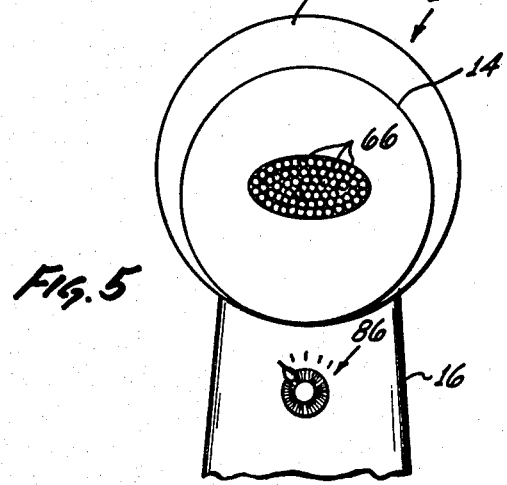
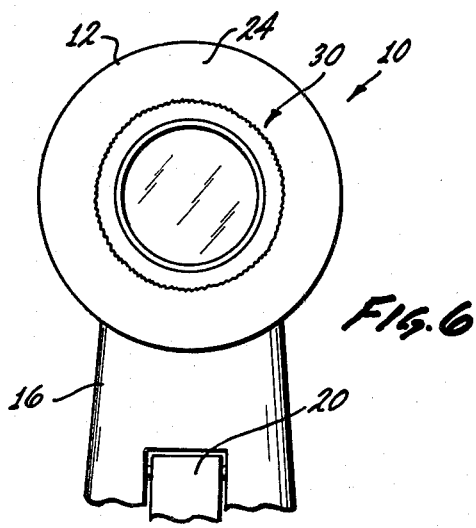

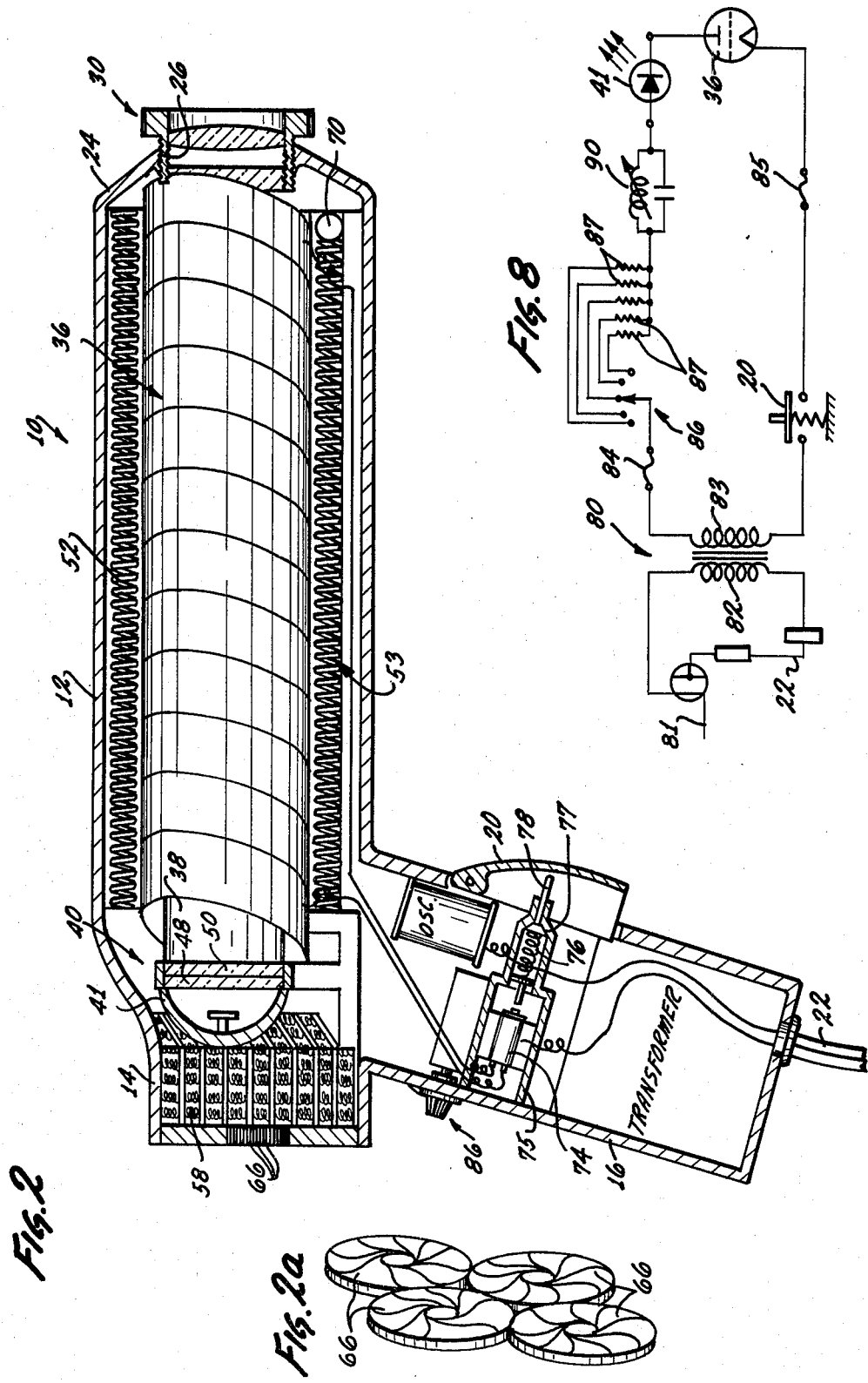

PORTABLE LASER DEVICE

This application is a continuation-in-part of Ser. No. 647,553, filed Jan. 8, 1976, and also Ser. No. 795,159 filed May 9, 1977 and now abandoned.

BACKGROUND OF THE INVENTION

1. Field of the Invention

The field of the invention is that of laser devices, that is, devices capable of producing or generating a laser beam useful for various purposes such as in surgery or otherwise. The invention is directed to a particular form of laser beam generator and particularly one that is constructed to be a manual, pistol-grip type of device.

2. Description of the Prior Art

Devices known as lasers capable of generating laser beams are known in the art, and utilized for various purposes including surgery or otherwise. To the extent such devices are known, it is considereed that they do not approach the construction and combination of the device as described in detail and claimed hereinafter. Attention is called to the U.S. Pat. Nos. 3,384,654; 3,392,260; and 3,753,145.

SUMMARY OF THE INVENTION

The device is a laser beam generator adapted for various uses such as in surgery. The device is constructed to be in a housing capable of being manually handled and operated. The device is of a pistol-grip type to facilitate manual handling with a trigger switch for initiating operation.

The laser beam generated by the device is an emission of coherent radiation which has the characteristic wavelengths, energy distribution and other properties consistent with the type of emissions produced by conventional laser systems.

The beam generator embodies a novel combination of elements calculated to more effectively produce the laser beam and to be more efficient. A particular form of photon emission device is used in association with the xenon flash tube and neodymium doped yttrium aluminum garnet or (Nd:YAG) rod which is commercially available or some similar variation of similar material known in the art. The (Nd:YAG) rod is doped in excess of 0.95 atomic percent Nd, and is situated in the optical cavity constituted by a photoemissive diode, two partially reflective mirrors, a helical xenon flash tube, all of which are contained within a reflective chamber.

Improved heat transmission and dissipating means are provided for controlling temperatures of the device. In the body or barrel of the device there is provided a cooling system including a material, preferably nylon phenolic quartz acrylic compound providing a temperature gradient and in which are embedded a plurality of parallel microcoil heat pipe tubes such that heat is carried rearwardly to a position at the rear of the device. At the rear of the device adjacent to the photon emission source is a heat sink cube for dissipating heat of construction as described in detail hereinafter. It comprises parallel plates or grids having between them a plurality of network of small coiled heat pipes operated to cause the heat to transfer to the grids and to be dissipated. As heat is absorbed by the nylon phenolic coolant medium in which the microcoiled heat pipes and grids are embedded, the coolant begins to vaporize, and by the vaporization of the coolant material, heat is dissipated. Then at the rear of the device are provided a series of unidirectional microvents for preventing development of excess pressure and for carrying away heat initiated as a result of coolant vaporization which exits aft of the device. The utility of the device lies in the fact that it is relatively compact, portable, and mobile which allows it to be utilized in close quarters and at close range. The entire unit can be moved to a designated place without the need of having an elaborate alteration in plumbing or mirror system to direct the beam to the sites of utilization. The realization of these characteristics are among objects of the invention.

The primary object of the invention is to provide an improved laser beam generator.

A further object is to provide an improved laser beam generator consisting of a combination of elements including a flash tube, laser rod, front and rear mirrors, and a photon emission source capable of realizing a more efficient and improved operation.

Further objects reside in realization of improvements as identified in the foregoing; in the performance of the laser; in the heat dissipating system and in the arrangement of components.

Further objects and additional advantages of the invention will become apparent from the following detailed description and annexed drawings.

BRIEF DESCRIPTION OF THE DRAWINGS

FIG. 1 is a pictorial view of the device of the invention;

FIG. 2 is a sectional view of the device;

FIG. 2a is a detail view of the microvents;

FIG. 3 is a detail view of the heat dissipating cube structure at the rear of the device;

FIG. 3(a) is a detail view of one of the microcoil super heat exchangers;

FIGS. 4(a), (b) and (c) are schematic detail views of the parabolic reflector and photon emission diode source;

FIG. 5 is a rear view of the device;

FIG. 6 is a front view;

FIG. 7 is a detail view of the thermistor temperature indicating system; and

FIG. 8 is a circuit diagram.

The device is a laser beam generator constructed to be portable. It is constructed in a pistol-grip type housing.

The device is calculated to produce a beam of light energy having particular characteristics adapted for use for surgical and other purposes as described in more detail hereinafter.

The device has certain particular characteristics which can be alluded to at the outset. It uses a modified helical xenon flash coil or flash tube. The convolutions of the tube are in close abutting relationship. Instead of utilizing the conventional mirror system as used with lasers such system is replaced by a parabolic reflector diode system. The coiled xenon flash tube surrounds the neodymium rod. The parabolic reflector diode is positioned aft of the rod. The rationale for employing the components as referred to will be described presently.

Referring to FIG. 1 of the drawings, the device is shown pictorially at 10. It has a cylindrical body part 12 with a smaller rear or aft part 14. The device is provided with a pistol grip as designated at 16 and at the front of the pistol grip is a trigger switch as designated at 20. Power is supplied to the device through coaxial cable from a power source 22. At the front end of the body part 12, there is a taper 24 and at the end of the taper is an outlet 26 for the beam provided with an optical focusing system as designated at 30.

The focusing system at the front end of the laser system has a lens with a very short focal distance which moves forward and backwards via the movement of a knurled knob as shown which when rotated moves the lens back and forth. This item is also obtained commercially. When the knurled knob is rotated, the lens moves along a circular type of slide. This type of lens system functions to focus the laser beam down to a smaller area or diffuse the beam to accommodate a larger area, and it can be detached from the laser system.

FIG. 2 shows the device in cross-section. Numeral 36 designates the helical xenon flash coil or flash tube which has a circular configuration and has electrical terminals to which a voltage is applied. The flash tube is mounted centrally within the body 12. Its convolutions abut each other as shown. Positioned within the flash coil or flash tube is the neodymium rod 38. The rod is a neodymium rod and as will be described, light energy causes atoms in the rod to be activated and to resonate back and forth until the atoms become sufficiently excited or energized to begin to emit light. The (Nd:YAG) rod is able to attain sufficient threshold energy contained within the rod to surmount a reflective barrier and the end result is the so-called "laser flash" and then it must build up again until a new threshold is reached. The rod may be neodymium (Nd:YAG) or lanthanum beryllate commercially available from Allied Chemical (U.S. Pat. No. 3,866,142).

At the aft or rear end of the (Nd:YAG) rod there is provided the parabolic reflector diode system designated generally by the numeral 40. (See FIGS. 4(a), (b) and (c). This is a unit which includes a parabolic reflector 41. Positioned at the center of the reflector are electrodes 42 and 43 including a cathode and an anode which, when energized, produce an arc and then the device constitutes a light emissive diode. The diode may be capable of emitting given frequencies. The main function of the diode is to provide the rod with additional quantum units in order to increase rate and duration of firing by a small but significant amount.

The coiled flash tube is of a type having a wavelength and pulse frequency corresponding to the absorption bands of the laser rod element which initiate an elevation in population inversion levels which approach the threshold value for a desired mode, the dimensions of the rod element always corresponding to a multiple of 5 millimeters in diameter and 45 millimeters in length in order to maintain an acceptable loss gain ratio.

Numeral 48 designates a light transparent lens member which forms the face of the photon emission source. Numeral 50 designates a polarized reflective mirror. This component is preferably of quartz and is constructed to act as a mirror with respect to certain wavelengths and to transmit other wavelengths of light.

The diode and polarized mirror 50 replace the conventional single completely reflective mirror aft of the rod and during the laser operation supply additional photon emissions as to cause the atoms of the rod to resonate producing a characteristic wavelength which differs from both the input of the emissive (laser injection) diode and the flash coil. The diode, polarized mirror, and flash coil serve to initiate a laser beam or flash which is increased not only in duration but frequency to a small but significant degree (5% relative).

Mirror 50 is placed in front of the diode and directly aft of the (Nd:YAG) rod. The mirror is composed of quartz and is coated with an appropriate dielectric compound. Many such dielectric compounds are readily available such that a specific type or brand of dielectric coating is not essential to the operation of the mirror. The quartz lattice of the mirror, in the case where a (Nd:YAG) rod previously mentioned is employed, the mirror is doped with iodine in excess of 0.2 atomic percent and in excess of 0.95 atomic percent with neodymium. The only requirement in the chemical composition and geometric arrangement of the mirrors lattice structure is that it corresponds to the chemical composition and lattice arrangement of the laser rod and this appears to be the case even when the laser rod is composed of other suitable materials such as lanthanum beryllate. This material, like the rod, itself is commercially available from Allied Chemical. This mirror compound, given a particular instance, has the ability to reflect given wavelengths such as 1.06-1.08 microns while allowing wave-lengths of, for example, 0.90 plus microns to pass, such that the diode emissions are allowed to pass through the polarized mirror, but wavelengths of 1.078 microns would not. In addition, the wavelengths entering the rod from the diode do not appear to return to the diode source.

The front mirror complex, of course, allows the laser pulse or so-called flash phenomenon, when the so-called threshold is surmounted.

In operation, the device generates a considerable amount of heat, and heat sink and transfer means are provided in order to dissipate the heat to prevent the temperature of the device from rising to high levels.

Within the body part 12, there is provided a light reflective inner jacket or lining as designated at 52 made of a suitable material, such as preferably chromium alloy. The cooling or heat dissipating system is a unique self-contained unit or system. Surrounding the flash tube 36 are a plurality or network of longitudinally extending microcoils 53, each of which forms a helical heat pipe. Each individual heat pipe operates in accordance with known heat pipe technology. They run parallel to the axis of the (Nd:YAG) rod. These heat pipes are embedded in a nylon phenolic quartz acrylic compound similar to the type used as heat shielding on space capsules but with lower heat of varporization. This material is constructed to provide temperature transfer gradients so that the heat tends to flow rearward in the device. A network of microcoils, superheat exchange coils, produce the heat pipes which conduct the heat away from the flash tube, diode, and the neodymium rod. Resonance and heat generated in the rod itself alone could cause fracturing of the rod. The microcoils are heat pipes preferably no larger than 1 mm in diameter. The acrylic compound forms an incredibly efficient heat sink and heat dissipation system. An apparent 80% plus or minus 5% heat exchange ratio has been obtained given the 80% of the heat emitted by the flash tube, diode, and region thereof is absorbed by the coolant system. The heat pipes are coiled or microcoiled in the periphery of the cooling body.

The cooling jacket is cylindrical encasing the rod and coiled flash tube. The microcoil heat pipes form a series of long parallel heat pipes which run longitudinally along the interior of the coolant jacket, and essentially cover the entire surface of the interior of the coolant jacket. The coiled heat pipes, are embedded in the acrylic compound. The heat pipes are coiled to provide the maximum heat exchange between the surfaces of the flashcoil, and diode and adjacent regions. (The greater the surface area of the exposed heat pipe the more thermal conductivity and heat exchange and as heat is absorbed by the compound, a phase change occurs from a solid to a gaseous vapor, and it is in this manner heat is dissipated.)

The coolant jacket as well as the cube is composed of a nylon-phenolic quartz acrylic compound which, when subjected to heat, slowly vaporizes at a given finite rate (it also chars to a minor extent). Heat flow is conducted from the forward portion of the laser system to the posterior region that is part 14 of the unit.

The nylon phenolic quartz acrylic compound preferably basically consists of a char forming phenolic layer with microglobules approaching 40 m (microns) in diameter with a wall thickness approaching 1-2 m (microns) are cross linked with a gas generating polymer such as nylon which when subjected to heat decomposes forming a vapor to facilitate the movement of heat away from structures, such as the microcoiled heat pipes embedded in the nylon phenolic quartz acrylic compound which absorbs and conducts heat away from the flash coil and diode. The ablative composites of the nylon phenolic undergo pyrolysis when subjected to heat and evolves gas. Quartz, fibers are added to the resin in order to reinforce the phenolic char, which allows the coolant to maintain a relatively stable structure while it undergoes vaporization. The vapor which eventually builds up pressure will exit out the micro vents structures aft of the device during the operation of the laser. Other variations of the nylon phenolic quartz compound are available and workable but the above appears to be more effective.

The housing 12 is preferably composed of aluminium alloy. The microcoiled heat pipes are preferably copper alloy which is commercially available. The flash tube comprises xenon gas in a quartz container. The convolutions are packed tight otherwise the tube is conventional. The reflective shell within the body is an alloy of chromium.

Within the rear part 14 of the device is provided a cube structure constituting a heat transfer and dissipating component. It is shown more in detail in FIG. 3. The form shown is essentially a cube. The cube comprises a plurality of parallel heat conducting plates as designated at 60a, 60b, 60c, 60e 60f, and 60g. Positioned in geometrically spaced relationship between these parallel plates are a plurality of microcoil super heat exchangers, one of which is designated at 62 in FIG. 3. Each of these microcoils is a heat pipe containing a suitable fluid such as normally used in heat pipes. Heat is conveyed rearwardly to the tube unit 58 which serves as a heat sink and dissipates the heat.

At the rear of the part 14 of the device centrally located are a plurality of unit directional microvents as designated at 66 in FIG. 5. These microvents are provided to relieve any pressure that may build up within the body 12 of the unit. The individual unidirectional microvents are readily available commercially.

The microvents are located in the rear of the laser system. The function of the microvent is to allow gas vapor and excess residual heat to escape from the laser system, eliminating a forced chamber reaction which can cause the unit to explode, from excess pressure due to thermal conductivity and vapor exit through the microvents via a pressure gradient. These microvents which are commercially available are so constructed as to have a swirl and a small concentric hole to allow flow of vapor and heat almost exclusively to the outside; hence, they are unidirectional for the most part.

At the front of the unit the focusing device 30 comprises lenses that are relatively movable angularly and axially for focusing.

Numeral 70 designates a thermistor that is mounted within the acrylic compound for sensing the temperature. See FIG. 2. It is powered by a battery 71 and it is connected to an ohmmeter 72 which is graduated or calibrated to indicate temperature.

Numeral 74 designates a microswitch mounted in a housing 75 that is within the pistol grip 16. The trigger member 20 acts on a stem 78 which is in the form of a plunger that acts against spring 76 in the part 77 of the switch housing. The switch controls power to the unit.

FIG. 8 is a simplified circuit diagram of the device. Power from a power source is conveyed to a transformer 80 by way of coaxial cable 81 from a suitable power supply. The transformer 80 has a primary 82 and a secondary 83. A voltage of 600 volts, for example, may be applied to the primary which is stepped up to 1,200 volts in the secondary 83. Numerals 84 and 85 designate fuses. Numeral 86 designates a rotary switch controlling a group of resistors 87 so that the power to the unit can be controlled. Numeral 90 designates an inductive-capacitance filter circuit which connects to the photon emission source of diode 41 which in turn is connected to flash tube 36. The components of the circuit are shown schematically since they are commercially available items.

OPERATION

The flash tube surrounds the neodymium rod with the two mirrors, one in front of the rod and one aft of the rod. When the device is turned on, the photon emission source emits energy which is reflected by the parabolic mirror into parallel collimated rays which traverse the polarized reflective mirror and pass through the rod. The light energy causes atoms in the rod to undergo an elevation and subsequent population inversion, the atoms now at a higher level become sufficiently excited to begin to emit light. As explained, one of the two mirrors is semitransparent such that when the rod attains a sufficient threshold of energy contained in the rod to surmount a reflective barrier, the end result is the so-called "laser flash" and then it must build up again until a new threshold is reached. The rationale for employing the diode as explained is that the rod attains an initial quantum threshold of energy which is necessary for a short, powerful intermediate photon emission which, by reason of the diode arrangement can greatly extend the duration of the laser flash or laser beam from $1 \times 10^{-9}$ of a second to $0.5 \times 10^1$ second or longer, although this value was not exceeded. In other words, the laser can operate continuously by the additional sequential emission or energization (activation) of the diode in conjunction with the flash tube.

The diode can be throught of as a source which continuously adds enough energy to keep this energy threshold or barrier surpassed for a much longer duration.

As explained, there is a combination focusing lens and semitransparent mirror at the front of the rod which can cause a small but significant spread or narrowing of the beam's effective size.

The heat is dissipated in the system as explained in the foregoing. Occasionally, the compound with the shell may char and vaporize. A series of small, unidirectional microvents are placed directly after the unit in the event of extreme pressure build up.

The device may or may not have its own self-contained power unit.

From the foregoing those skilled in the art will readily appreciate and understand the construction and utilization of the invention and the manner in which it achieves the objects as set forth in the foregoing.

The foregoing disclosure is a representative from of the invention and is to be interpreted in an illustrative rather than a limiting sense, the invention to be accorded the full scope of the claims appended hereto.

I claim:

1. A laser beam generating device, comprising
   (a) a crystalline laser active media of a generally cylindrically shaped crystal of light amplifying material which is capable of producing a coherent light beam,
   (b) a pump source for said crystal in the form of a spiral shaped flash tube disposed about the crystal which can be pumped to produce light which is readily absorbable by the crystal,
   (c) electrical power supply means connected to the flash tube for producing a light flash,
   (d) a resonant cavity including a partially reflecting front mirror and a rear mirror disposed adjacent the end surfaces of the crystal to provide reflectivity along the crystal longitudinal axis,
   (e) a light emitting arc source means disposed behind the rear mirror and in alignment with the crystal longitudinal axis for producing a high intensity light including a wave length that can pass through the rear mirror and is absorbable by the crystal, and
   (f) a parabolic light reflecting mirror disposed immediately behind the light emitting arc source means and in alignment with the crystal axis with its focal point disposed at the position of the light emitting arc source.

2. The laser beam generating device as set forth in claim 1, wherein:
   (a) the rear mirror is partly reflective and partly capable of transmission of light to permit light from the light emitting arc source means to pass therethrough.

3. The laser beam generating device as set forth in claim 1, wherein:
   (a) the light emitting arc source means is a photon emitting diode, and
   (b) the rear mirror allows substantially 90% transmission of emissive radiation from the diode.

4. A laser beam generating device, comprising:
   (a) a crystalline laser active media of a generally cylindrically shaped crystal of light amplifying material which is capable of producing a coherent light beam,
   (b) a pump source for said crystal in the form of a spiral shaped flash tube disposed about the crystal which can be pumped to produce light which is readily absorbable by the crystal,
   (c) electrical power supply means connected to the flash tube for producing a light flash,
   (d) a resonant cavity including a partially reflecting front mirror and a rear mirror disposed adjacent the end surfaces of the crystal to provide reflectivity along the crystal longitudinal axis,
   (e) a cylindrical housing disposed adjacent and around the flash tube and having a forward opening in line with the longitudinal axis of the crystal and directly in front of the front mirror,
   (f) heat absorbing and transfer means within the housing and surrounding the flash tube for absorbing heat and transferring it to the rear of the housing, and
   (g) heat dissipating means disposed within the housing and adjacent the rear of the housing for receiving heat and conveying it out through the housing.

5. The laser beam generating device as set forth in claim 4, wherein:
   (a) the cylindrical housing has vents therethrough which are disposed adjacent the rear of the housing and are part of the heat dissipating means.

6. The laser beam generating device as set forth in claim 4, wherein:
   (a) the heat absorbing and transferring means includes a plurality of longitudinally extending heat pipes, and
   (b) the heat pipes extend substantially the length of the cylindrical housing and conduct heat toward the rear of the housing.

7. The laser beam generating device as set forth in claim 4, wherein:
   (a) the heat dissipating means is disposed adjacent the rear of the housing and the rear mirror, and
   (b) the heat dissipating means includes a plurality of parallel heat transfer plates which are in contact with a plurality of heat pipes which extend parallel to the housing axis.

8. The laser beam generating device as set forth in claim 4, wherein:
   (a) the cylindrical housing has a series of vents at the rear thereof, and
   (b) the heat absorbing and transferring means includes a cylindrical assembly of longitudinally extending heat pipes embedded within an organic compound which vaporizes within a temperature range which is at the higher level of operably acceptable temperature.

9. The laser beam generating device as set forth in claim 4, wherein:
   (a) a light emitting arc source means is disposed behind the rear mirror and in alignment with the crystal longitudinal axis for producing a high intensity light including a wave length that can pass through the rear mirror and is absorbable by the crystal, and
   (b) a parabolic light reflecting mirror is disposed immediately behind the light emitting arc source means and in alignment with the crystal axis with its focal point disposed at the position of the light emitting arc source means.

10. The laser beam generating device of claim 4, wherein:
    (a) the heat absorbing and transferring means includes a plurality of spaced, longitudinally extending coiled heat pipes.

11. The laser beam generating device as set forth in claim 10, wherein:
    (a) the heat pipes are embedded in an acrylic compound which vaporizes within a preselected temperature range.

* * * * *